(12) United States Patent
Li et al.

(10) Patent No.: US 10,701,139 B2
(45) Date of Patent: Jun. 30, 2020

(54) LIFE CYCLE MANAGEMENT METHOD AND APPARATUS

(71) Applicant: Huawei Technologies Co., Ltd., Shenzhen (CN)

(72) Inventors: Shitao Li, Nanjing (CN); Deepanshu Gautam, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 250 days.

(21) Appl. No.: 15/872,507

(22) Filed: Jan. 16, 2018

(65) Prior Publication Data

US 2018/0146031 A1 May 24, 2018

Related U.S. Application Data

(63) Continuation of application No. PCT/CN2016/080138, filed on Apr. 25, 2016.

(30) Foreign Application Priority Data

Jul. 20, 2015 (CN) .......................... 2015 1 0429123

(51) Int. Cl.
*H04L 29/08* (2006.01)
*H04L 12/24* (2006.01)
(Continued)

(52) U.S. Cl.
CPC ...... *H04L 67/1008* (2013.01); *G06F 9/45558* (2013.01); *H04L 41/00* (2013.01);
(Continued)

(58) Field of Classification Search
CPC . H04L 67/1008; H04L 41/5009; H04L 41/00; H04L 41/5051; H04L 67/2814;
(Continued)

(56) References Cited

U.S. PATENT DOCUMENTS 5,379,423 A * 1/1995 Mutoh ................. G06F 16/289
10,020,996 B1 * 7/2018 Protasov ............. H04L 41/0893
(Continued)

FOREIGN PATENT DOCUMENTS

CN 101976314 A 2/2011
CN 104115447 A 10/2014
(Continued)

OTHER PUBLICATIONS

Intel, et al., "pCR VNF expansion use cases," 3GPP TSG SA WG5 (Telecom Management) Meeting #97, Oct. 20-24, 2014, S5-145232, 3 pages.
(Continued)

*Primary Examiner* — Aravind K Moorthy
(74) *Attorney, Agent, or Firm* — Conley Rose, P.C.

(57) ABSTRACT

A life cycle management method and an apparatus, where the method includes receiving a life cycle management operation request for a first virtualized network function (VNF) instance, where the life cycle management operation request includes an instance identifier (ID) of the first VNF instance and an operation type, determining, according to a correspondence between an instance ID of a VNF instance and a life cycle management operation type, that the operation type falls within life cycle management operation types corresponding to the instance ID, where the life cycle management operation type in the correspondence represents that the life cycle management operation type is authorized by an authorization subject, and initiating a resource operation request to a virtualized infrastructure manager (VIM), where the resource operation request includes the instance ID.

20 Claims, 7 Drawing Sheets

(51) Int. Cl.
*G06F 9/455* (2018.01)
*H04L 29/06* (2006.01)

(52) U.S. Cl.
CPC ...... *H04L 41/0806* (2013.01); *H04L 41/0893* (2013.01); *H04L 41/5009* (2013.01); *H04L 41/5051* (2013.01); *H04L 63/0281* (2013.01); *H04L 63/107* (2013.01); *H04L 63/20* (2013.01); *H04L 67/2814* (2013.01); *G06F 2009/45595* (2013.01)

(58) Field of Classification Search
CPC ... H04L 63/20; H04L 63/107; H04L 63/0281; H04L 41/0893; H04L 41/0806; H04L 41/04; G06F 9/45558; G06F 2009/45595
USPC .......................................................... 726/1
See application file for complete search history.

(56) References Cited

U.S. PATENT DOCUMENTS

| | | | | |
|---|---|---|---|---|
| 2006/0039364 | A1* | 2/2006 | Wright | H04L 47/20 370/352 |
| 2006/0143217 | A1* | 6/2006 | Stanev | G06Q 10/06 |
| 2007/0162749 | A1* | 7/2007 | Lim | G06F 21/6227 713/167 |
| 2008/0104708 | A1* | 5/2008 | Kerschbaum | G06Q 10/10 726/27 |
| 2008/0109874 | A1* | 5/2008 | Kulkarni | G06F 21/31 726/2 |
| 2011/0072486 | A1* | 3/2011 | Hadar | G06F 9/45558 726/1 |
| 2012/0084262 | A1* | 4/2012 | Dwarampudi | G06F 3/0619 707/667 |
| 2014/0096134 | A1* | 4/2014 | Barak | G06F 21/566 718/1 |
| 2014/0189685 | A1* | 7/2014 | Kripalani | G06F 9/45533 718/1 |
| 2014/0317293 | A1* | 10/2014 | Shatzkamer | G06F 9/455 709/226 |
| 2015/0032627 | A1* | 1/2015 | Dill | G06Q 20/385 705/44 |
| 2015/0134485 | A1 | 5/2015 | Kim et al. | |
| 2015/0312038 | A1* | 10/2015 | Palanisamy | H04L 9/3213 713/155 |
| 2015/0341387 | A1* | 11/2015 | Ho | H04L 63/20 726/1 |
| 2016/0063417 | A1* | 3/2016 | Mandalia | G06F 16/24578 705/7.25 |
| 2016/0072761 | A1* | 3/2016 | Shih | H04L 61/2015 709/220 |
| 2016/0224409 | A1 | 8/2016 | Liu et al. | |
| 2016/0277250 | A1* | 9/2016 | Maes | H04L 41/0896 |
| 2016/0328258 | A1* | 11/2016 | Iwashina | G06F 9/5077 |
| 2016/0378361 | A1* | 12/2016 | Uriel | G06F 3/0664 718/1 |
| 2017/0034318 | A1 | 2/2017 | Gong et al. | |
| 2017/0063598 | A1* | 3/2017 | Zhu | H04L 41/20 |
| 2017/0220371 | A1* | 8/2017 | Kosugi | G06F 9/5077 |
| 2017/0272354 | A1* | 9/2017 | Chen | H04L 43/06 |
| 2017/0315839 | A1* | 11/2017 | Zhang | G06F 9/4856 |
| 2017/0317872 | A1* | 11/2017 | Zhu | H04L 41/065 |
| 2018/0307538 | A1* | 10/2018 | Meng | G06F 9/50 |

FOREIGN PATENT DOCUMENTS

| | | |
|---|---|---|
| CN | 104170323 A | 11/2014 |
| CN | 104219127 A | 12/2014 |
| EP | 3119034 A1 | 1/2017 |
| WO | 2013165369 A1 | 11/2013 |
| WO | 2015042937 A1 | 4/2015 |

OTHER PUBLICATIONS

China Mobile, et al., "Add NFV lifecycle operation granting use case," 3GPP TSG SA WG5 (Telecom Management) Meeting #97, Oct. 20-24, 2014, S5-145189, 2 pages.
Machine Translation and Abstract of Chinese Publication No. CN104219127, dated Dec. 17, 2014, 37 pages.
Foreign Communication From a Counterpart Application, Chinese Application No. 201510429123.1, Chinese Office Action dated Dec. 14, 2018, 5 pages.
Machine Translation and Abstract of Chinese Publication No. CN101976314, dated Feb. 16, 2011, 19 pages.
"Network Function Virtualization (NFV) Management and Orchestration Report on Architectural Options," ETSI GS IVA 009 V0.2.0, Apr. 2015, 15 pages.
Foreign Communication From a Counterpart Application, PCT Application No. PCT/CN2016/080138, English Translation of International Search Report dated Jul. 28, 2016, 2 pages.
Foreign Communication From a Counterpart Application, PCT Application No. PCT/CN2016/080138, English Translation of Written Opinion dated Jul. 28, 2016, 7 pages.
Lin, L., et al., "A Privacy-aware Cloud Service Selection Method toward Data Life-cycle," XP032771437, Dec. 16, 2014, 8 pages.
Foreign Communication From a Counterpart Application, European Application No. 16827072.6, Extended European Search Report dated Apr. 30, 2018, 9 pages.

* cited by examiner

LIFE CYCLE MANAGEMENT METHOD AND APPARATUS

CROSS-REFERENCE TO RELATED APPLICATIONS

This application is a continuation of International Patent Application No. PCT/CN2016/080138 filed on Apr. 25, 2016, which claims priority to Chinese Patent Application No. 201510429123.1 filed on Jul. 20, 2015. The disclosures of the aforementioned applications are hereby incorporated by reference in their entireties.

TECHNICAL FIELD

The present disclosure relates to the field of cloud computing technologies, and in particular, to a life cycle management method and an apparatus.

BACKGROUND

Network function virtualization (NFV) refers to a function of carrying a dedicated device in a conventional network using a general hardware device and a virtualization technology in order to reduce high costs for deploying the dedicated device. Software is not bound to dedicated hardware such that a network device function no longer depends on the dedicated hardware. In addition, a resource may be fully and flexibly shared using a feature of cloud computing in order to implement rapid development and deployment of a new service, and perform automatic deployment, scaling, fault isolation, self-healing, and the like based on an actual service requirement. In an NFV architecture, a party that receives an instantiation request and performs instantiation processing (service deployment) on a corresponding service according to the request is referred to as a virtualized service provider (service provider), and a party that initiates the instantiation request is referred to as a service requester.

In the NFV, a virtualized network service (NS), for example, may be an Internet Protocol (IP) multimedia subsystem (IMS) NS, or an evolved packet core (EPC) NS. One NS may include several virtualized network function (VNF) modules, which are also referred to as virtualized network elements. A VNF may be implemented by network function software deployed in an NFV infrastructure. When virtualized deployment is performed on an NS, a service requester needs to first submit a descriptor of the NS (NSD) to a service provider. The descriptor mainly describes a topology structure of the NS and a descriptor of each included VNF (VNFD). The VNFD describes composition of each VNF, for example, running software and information about a required virtual resource. The virtual resource includes a central processing unit (CPU) resource, a storage resource, and the like.

Referring to FIG. 1, FIG. 1 is a schematic architectural diagram of an NFV system 100.

A network function virtualization orchestrator (NFVO) 102 is mainly responsible for processing life cycle management of a virtualized service, allocating and scheduling virtual resources in a virtualized infrastructure and a network functions virtualization infrastructure (NFVI), and the like. The NFVO 102 may communicate with one or more VNF managers (VNFMs) 104 to execute a resource-related request, send configuration information to the VNFM 104, and collect status information of a VNF 108. In addition, the NFVO 102 may also communicate with a virtualized infrastructure manager (VIM) 106 to execute resource allocation and/or reservation, and exchange virtualized hardware resource configuration and status information.

The VNFM 104 is responsible for life cycle management of one or more VNFs 108, for example, instantiating, updating, querying, scaling, or terminating the VNF 108. The VNFM 104 may communicate with the VNF 108 to complete VNF life cycle management and exchange of configuration and status information. In an NFV architecture, there may be multiple VNFMs responsible for performing life cycle management on different types of VNFs.

The VIM 106 controls and manages interaction between the VNF 108 and computing hardware 112, storage hardware 114, network hardware 116, virtual computing 118, virtual storage 120, and a virtual network 122. For example, the VIM 106 executes a resource management function, including infrastructure resource management, allocation (for example, adding a resource to a virtual container), and a running function (for example, collecting fault information of the NFVI). The VNFM 104 and the VIM 106 may mutually communicate to request resource allocation, and exchange virtualized hardware resource configuration and status information.

The NFVI, that is, an NFV infrastructure layer, includes a hardware component, a software component, or a combination of a hardware component and a software component in order to establish a virtualized environment, and deploy, manage, and implement the VNF 108. A hardware resource and a virtualization layer are used to provide virtualized resources for the VNF 108, for example, a virtual machine and a virtual container in another form. The hardware resource includes the computing hardware 112, the storage hardware 114, and the network hardware 116. In an implementation manner, resources of the computing hardware 112 and the storage hardware 114 may be integrated. The virtualization layer in the NFVI may abstract the hardware resource, and decouple the VNF 108 and a lower physical network layer.

Multiple VNFs 108 are configured as virtualization of at least one network function. Each VNF runs in a virtual container, and corresponds to a group of network functions that belong to one or more physical devices.

An equipment management system (EM) 110 is a system used for device configuration and management in a conventional telecommunications system. In the NFV architecture, the EM 110 may also be used to configure and manage the VNF 108, and initiate a life cycle management operation such as instantiation of a new VNF to the VNFM 104.

An operations support system (OSS) and a business support system (BSS) 124 support various end-to-end telecommunications services. A management function supported by the OSS includes network configuration, service providing, fault management, and the like. The BSS processes an order, payment, revenues, and the like, and supports product management, order management, revenue management, and customer management.

In an existing NFV architecture, because an NFVO needs to globally control resources, after receiving a life cycle management operation request that is for a VNF instance and that is sent by an EM, a VNFM needs to first apply to the NFVO for authorization permission in response to the life cycle management operation request for the VNF instance. Only after the NFVO agrees upon the operation request, the VNFM may apply to a VIM for a resource required for the operation request.

However, one NFVO needs to simultaneously manage multiple VNFMs, and each VNFM may manage multiple VNFs. As a result, there is an extremely large quantity of operations related to life cycle management. Therefore, the NFVO has relatively heavy load.

SUMMARY

The present disclosure provides a life cycle management method and an apparatus in order to resolve a problem that an authorization subject has relatively heavy load because the authorization subject needs to be applied to for authorization of each life cycle management operation.

A first aspect of the present disclosure provides a life cycle management method, including receiving a life cycle management operation request for a first VNF instance, where the life cycle management operation request includes an instance identifier (ID) of the first VNF instance and an operation type, determining, according to a correspondence between an instance ID of a VNF instance and a life cycle management operation type, that the operation type falls within life cycle management operation types corresponding to the instance ID, where the life cycle management operation type in the correspondence represents that the life cycle management operation type is authorized by an authorization subject, and initiating a resource operation request to a VIM, where the resource operation request includes the instance ID.

With reference to the first aspect, in a first possible implementation manner of the first aspect, before the receiving a life cycle management operation request for a first VNF instance, the method further includes sending a proxy authorization request to the authorization subject, where the proxy authorization request is used to request the authorization subject to authorize all life cycle management operations of the first VNF instance, receiving proxy authorization policy information sent by the authorization subject, where the proxy authorization policy information is used to indicate a type of an authorized life cycle management operation, and generating the correspondence based on the instance ID and the proxy authorization policy information.

With reference to the first aspect, in a second possible implementation manner of the first aspect, before the receiving a life cycle management operation request for a first VNF instance, the method further includes sending an instantiation request to the authorization subject, where the instantiation request further includes a proxy authorization request, and the proxy authorization request is used to request the authorization subject to authorize another life cycle management operation other than instantiation of the first VNF instance.

With reference to the second possible implementation manner of the first aspect, in a third possible implementation manner of the first aspect, after sending an instantiation request to the authorization subject, the method further includes receiving a location relationship and an ID of a physical host corresponding to the location relationship that are sent by the authorization subject, where the location relationship is a location relationship between the first VNF instance and an instance of another VNF, and sending the ID of the physical host to the VIM.

With reference to any one of the first aspect or the first possible implementation manner of the first aspect to the third possible implementation manner of the first aspect, in a fourth possible implementation manner of the first aspect, after determining that the operation type falls within life cycle management operation types corresponding to the instance ID, the method further includes obtaining a VNFD of the VNF corresponding to the first VNF instance, determining, according to the VNFD, that normal running of the other VNF depends on normal running of the VNF, where the other VNF and the VNF are managed by a same VNFM, and initiating an operation related to the operation type for the instance of the other VNF.

A second aspect of the present disclosure provides a proxy authorization policy determining method, including receiving a proxy authorization request sent by a VNFM, where the proxy authorization request is used to request to authorize a life cycle management operation of a first VNF instance, obtaining a VNFD of a VNF corresponding to the first VNF instance, determining, according to a dependency relationship and/or a location relationship between the VNF and another VNF that are/is described in the VNFD, an operation type on which proxy authorization can be performed and that falls within all life cycle management operation types for the first VNF instance, where the operation type is an operation type that does not affect the dependency relationship and/or the location relationship, and sending proxy authorization policy information to the VNFM, where the policy information is used to indicate the operation type.

With reference to the second aspect, in a first possible implementation manner of the second aspect, the proxy authorization request is carried in an instantiation request used to obtain the first VNF instance, and the proxy authorization request is used to request to authorize another life cycle management operation other than instantiation of the first VNF instance.

With reference to the first possible implementation manner of the second aspect, in a second possible implementation manner of the second aspect, after the instantiation request is received, the method further includes sending a query request to a VIM according to the location relationship in order to request an ID of a physical host on which an instance of a second VNF that has the location relationship with the VNF is deployed, where the query request includes an instance ID of the instance of the second VNF, receiving the ID of the physical host that is sent by the VIM, and providing the ID of the physical host and the location relationship for the VIM using the VNFM.

With reference to the second aspect, the first possible implementation manner of the second aspect, or the second possible implementation manner of the second aspect, in a third possible implementation manner of the second aspect, the dependency relationship includes whether the VNF and the other VNF are managed by a same VNFM, and normal running of the other VNF depends on normal running of the VNF, or normal running of the VNF depends on normal running of the other VNF, and the location relationship is that the first VNF and an instance of the other VNF need to be deployed on a same physical host, or the first VNF and an instance of the other VNF cannot be simultaneously deployed on a same physical host.

With reference to the third possible implementation manner of the second aspect, in a fourth possible implementation manner of the second aspect, that the operation type is an operation type that does not affect the dependency relationship and/or the location relationship includes that the other VNF that depends on the VNF can still normally run after an operation corresponding to the operation type is performed on the first VNF instance, and/or the first VNF and the instance of the other VNF do not have a location exclusion relationship after an operation corresponding to the operation type is performed on the first VNF instance.

With reference to the third possible implementation manner of the second aspect or the fourth possible implementation manner of the second aspect, in a fifth possible implementation manner of the second aspect, determining, according to a dependency relationship and/or a location relationship between the VNF and another VNF that are/is described in the VNFD, an operation type on which proxy authorization can be performed and that falls within all life cycle management operation types for the first VNF instance includes when the normal running of the other VNF depends on the VNF, and the other VNF and the VNF are managed by different VNFMs, determining that the operation type on which proxy authorization can be performed is another life cycle management operation type other than disablement and scale-in, determining that the operation type on which proxy authorization can be performed is all life cycle management operation types when the normal running of the other VNF depends on the VNF, and both the other VNF and the VNF are managed by the VNFM or determining that the operation type on which proxy authorization can be performed is another life cycle management operation type other than migration when the VNF and the other VNF have the location relationship.

A third aspect of the present disclosure provides a computer apparatus, including a receiving unit configured to receive a life cycle management operation request for a first VNF instance, where the life cycle management operation request includes an instance ID of the first VNF instance and an operation type, a processing unit configured to determine, according to a correspondence between an instance ID of a VNF instance and a life cycle management operation type, that the operation type falls within life cycle management operation types corresponding to the instance ID, where the life cycle management operation type in the correspondence represents that the life cycle management operation type is authorized by an authorization subject, and a sending unit configured to initiate a resource operation request to a VIM, where the resource operation request includes the instance ID.

With reference to the third aspect, in a first possible implementation manner of the third aspect, the sending unit is further configured to send a proxy authorization request to the authorization subject before the receiving unit receives the life cycle management operation request for the first VNF instance, where the proxy authorization request is used to request the authorization subject to authorize all life cycle management operations of the first VNF instance. The receiving unit is further configured to receive proxy authorization policy information sent by the authorization subject, where the proxy authorization policy information is used to indicate a type of an authorized life cycle management operation, and the processing unit is further configured to generate the correspondence based on the instance ID and the proxy authorization policy information.

With reference to the third aspect, in a second possible implementation manner of the third aspect, the sending unit is further configured to send an instantiation request to the authorization subject before the receiving unit receives the life cycle management operation request for the first VNF instance, where the instantiation request further includes a proxy authorization request, and the proxy authorization request is used to request the authorization subject to authorize another life cycle management operation other than instantiation of the first VNF instance.

With reference to the second possible implementation manner of the third aspect, in a third possible implementation manner of the third aspect, the receiving unit is further configured to receive a location relationship and an ID of a physical host corresponding to the location relationship that are sent by the authorization subject after the sending unit sends the instantiation request to the authorization subject, where the location relationship is a location relationship between first VNF instance and an instance of another VNF, and the sending unit is further configured to send the ID of the physical host to the VIM.

With reference to any one of the third aspect or the first possible implementation manner of the third aspect to the third possible implementation manner of the third aspect, in a fourth possible implementation manner of the third aspect, after determining that the operation type falls within the life cycle management operation types corresponding to the instance ID, the processing unit is further configured to obtain a VNFD of the VNF corresponding to the first VNF instance, determine, according to the VNFD, that normal running of the other VNF depends on normal running of the VNF, where the other VNF and the VNF are managed by a same VNFM, and initiate an operation related to the operation type for the instance of the other VNF.

A fourth aspect of the present disclosure provides a computer apparatus, including a receiving unit configured to receive a proxy authorization request sent by a VNFM, where the proxy authorization request is used to request to authorize a life cycle management operation of a first VNF instance, a processing unit configured to obtain a VNFD of a VNF corresponding to the first VNF instance, and determine, according to a dependency relationship and/or a location relationship between the VNF and another VNF that are/is described in the VNFD, an operation type on which proxy authorization can be performed and that falls within all life cycle management operation types for the first VNF instance, where the operation type is an operation type that does not affect the dependency relationship and/or the location relationship, and a sending unit configured to send proxy authorization policy information to the VNFM, where the policy information is used to indicate the operation type.

With reference to the fourth aspect, in a first possible implementation manner of the fourth aspect, the proxy authorization request is carried in an instantiation request used to obtain the first VNF instance, and the proxy authorization request is used to request to authorize another life cycle management operation other than instantiation of the first VNF instance.

With reference to the first possible implementation manner of the fourth aspect, in a second possible implementation manner of the fourth aspect, the sending unit is further configured to send a query request to a VIM according to the location relationship after the receiving unit receives the instantiation request in order to request an ID of a physical host on which an instance of a second VNF that has the location relationship with the VNF is deployed, where the query request includes an instance ID of the instance of the second VNF, the receiving unit is further configured to receive the ID of the physical host that is sent by the VIM, and the sending unit is further configured to provide the ID of the physical host and the location relationship for the VIM using the VNFM.

With reference to the fourth aspect, the first possible implementation manner of the fourth aspect, or the second possible implementation manner of the fourth aspect, in a third possible implementation manner of the fourth aspect, the dependency relationship includes whether the VNF and the other VNF are managed by a same VNFM, and normal running of the other VNF depends on normal running of the VNF, or normal running of the VNF depends on normal running of the other VNF, and the location relationship is that the first VNF and an instance of the other VNF need to be deployed on a same physical host, or the first VNF and an instance of the other VNF cannot be simultaneously deployed on a same physical host.

With reference to the third possible implementation manner of the fourth aspect, in a fourth possible implementation manner of the fourth aspect, that the operation type is an operation type that does not affect the dependency relationship and/or the location relationship includes that the other VNF that depends on the VNF can still normally run after an operation corresponding to the operation type is performed on the first VNF instance, and/or the first VNF and the instance of the other VNF do not have a location exclusion relationship after an operation corresponding to the operation type is performed on the first VNF instance.

With reference to the third possible implementation manner of the fourth aspect or the fourth possible implementation manner of the fourth aspect, in a fifth possible implementation manner of the fourth aspect, the processing unit is configured to determine that the operation type on which proxy authorization can be performed is another life cycle management operation type other than disablement and scale-in when the normal running of the other VNF depends on the VNF, and the other VNF and the VNF are managed by different VNFMs, determine that the operation type on which proxy authorization can be performed is all life cycle management operation types when the normal running of the other VNF depends on the VNF, and both the other VNF and the VNF are managed by the VNFM, or determine that the operation type on which proxy authorization can be performed is another life cycle management operation type other than migration when the VNF and the other VNF have the location relationship.

A fifth aspect of the present disclosure provides a network element used for life cycle management, including a memory configured to store computer executable program code, a transceiver, and a processor coupled to the memory and the transceiver, where the program code includes an instruction, and when the processor executes the instruction, the instruction enables the network element to perform the operations of receiving a life cycle management operation request for a first VNF instance using the transceiver, where the life cycle management operation request includes an instance ID of the first VNF instance and an operation type, determining, according to a correspondence between an instance ID of a VNF instance and a life cycle management operation type, that the operation type falls within life cycle management operation types corresponding to the instance ID, where the life cycle management operation type in the correspondence represents that the life cycle management operation type is authorized by an authorization subject, and initiating a resource operation request to a VIM using the transceiver, where the resource operation request includes the instance ID.

With reference to the fifth aspect, in a first possible implementation manner of the fifth aspect, when the processor executes the instruction, before receiving the life cycle management operation request for the first VNF instance using the transceiver, the instruction enables the network element to further perform the operations of sending a proxy authorization request to the authorization subject using the transceiver, where the proxy authorization request is used to request the authorization subject to authorize all life cycle management operations of the first VNF instance, receiving, using the transceiver, proxy authorization policy information sent by the authorization subject, where the proxy authorization policy information is used to indicate a type of an authorized life cycle management operation, and generating the correspondence based on the instance ID and the proxy authorization policy information.

With reference to the fifth aspect, in a second possible implementation manner of the fifth aspect, when the processor executes the instruction, before receiving the life cycle management operation request for the first VNF instance using the transceiver, the instruction enables the network element to further perform the operation of sending an instantiation request to the authorization subject using the transceiver, where the instantiation request further includes a proxy authorization request, and the proxy authorization request is used to request the authorization subject to authorize another life cycle management operation other than instantiation of the first VNF instance.

With reference to the second possible implementation manner of the fifth aspect, in a third possible implementation manner of the fifth aspect, after sending the instantiation request to the authorization subject using the transceiver and when the processor executes the instruction, the instruction further enables the network element to perform the operations of receiving, using the transceiver, a location relationship and an ID of a physical host corresponding to the location relationship that are sent by the authorization subject, where the location relationship is a location relationship between the first VNF instance and an instance of another VNF, and sending the ID of the physical host to the VIM using the transceiver.

With reference to any one of the fifth aspect or the first possible implementation manner of the fifth aspect to the third possible implementation manner of the fifth aspect, in a fourth possible implementation manner of the fifth aspect, when the processor executes the instruction, the instruction enables the network element to further perform the operations of obtaining a VNFD of the VNF corresponding to the first VNF instance after determining that the operation type falls within the life cycle management operation types corresponding to the instance ID, determining, according to the VNFD, that normal running of the other VNF depends on normal running of the VNF, where the other VNF and the VNF are managed by a same VNFM, and initiating an operation related to the operation type for the instance of the other VNF.

A sixth aspect of the present disclosure provides a network element used to determine a proxy authorization policy, including a memory configured to store computer executable program code, a transceiver, and a processor coupled to the memory and the transceiver, where the program code includes an instruction, and when the processor executes the instruction, the instruction enables the network element to perform the following operations receiving, using the transceiver, a proxy authorization request sent by a VNFM, where the proxy authorization request is used to request to authorize a life cycle management operation of a first VNF instance, obtaining a VNFD of a VNF corresponding to the first VNF instance, determining, according to a dependency relationship and/or a location relationship between the VNF and another VNF that are/is described in the VNFD, an operation type on which proxy authorization can be performed and that falls within all life cycle management operation types for the first VNF instance, where the operation type is an operation type that does not affect the dependency relationship and/or the location relationship, and sending proxy authorization policy information to the VNFM using the transceiver, where the policy information is used to indicate the operation type.

With reference to the sixth aspect, in a first possible implementation manner of the sixth aspect, the proxy authorization request is carried in an instantiation request used to obtain the first VNF instance, and the proxy authorization request is used to request to authorize another life cycle management operation other than instantiation of the first VNF instance.

With reference to the first possible implementation manner of the sixth aspect, in a second possible implementation manner of the sixth aspect, when the processor executes the instruction, the instruction enables the network element to further perform the operations of sending a query request to a VIM according to the location relationship after receiving the instantiation request using the transceiver in order to request an ID of a physical host on which an instance of a second VNF that has the location relationship with the VNF is deployed, where the query request includes an instance ID of the instance of the second VNF, receiving, using the transceiver, the ID of the physical host that is sent by the VIM, and providing the ID of the physical host and the location relationship for the VIM using the VNFM.

With reference to the sixth aspect, the first possible implementation manner of the sixth aspect, or the second possible implementation manner of the sixth aspect, in a third possible implementation manner of the sixth aspect, the dependency relationship includes whether the VNF and the other VNF are managed by a same VNFM, and normal running of the other VNF depends on normal running of the VNF, or normal running of the VNF depends on normal running of the other VNF, and the location relationship is that the first VNF and an instance of the other VNF need to be deployed on a same physical host, or the first VNF and an instance of the other VNF cannot be simultaneously deployed on a same physical host.

With reference to the third possible implementation manner of the sixth aspect, in a fourth possible implementation manner of the sixth aspect, that the operation type is an operation type that does not affect the dependency relationship and/or the location relationship includes that the VNF that depends on the VNF can still normally run after an operation corresponding to the operation type is performed on the first VNF instance, and/or the first VNF and the instance of the other VNF do not have a location exclusion relationship after an operation corresponding to the operation type is performed on the first VNF instance.

With reference to the third possible implementation manner of the sixth aspect or the fourth possible implementation manner of the sixth aspect, in a fifth possible implementation manner of the sixth aspect, when the processor executes the instruction, the instruction enables the network element to further perform the operation of determining that the operation type on which proxy authorization can be performed is another life cycle management operation type other than disablement and scale-in when the normal running of the other VNF depends on the VNF, and the other VNF and the VNF are managed by different VNFMs, determining that the operation type on which proxy authorization can be performed is all life cycle management operation types when the normal running of the other VNF depends on the VNF, and both the other VNF and the VNF are managed by the VNFM, or determining that the operation type on which proxy authorization can be performed is another life cycle management operation type other than migration when the VNF and the other VNF have the location relationship.

One or more technical solutions provided in the embodiments of the present disclosure have at least the following technical effects or advantages.

In the embodiments of the present disclosure, when a life cycle management operation request for a first VNF instance is received, it is determined, according to an instance ID and a correspondence between an instance ID and a life cycle management operation type, that an operation type carried in the operation request falls within life cycle management operation types corresponding to the instance ID, where the life cycle management operation type in the correspondence represents that the life cycle management operation type is authorized by an authorization subject. Therefore, a resource operation request may be directly initiated to a VIM, and there is no need to request authorization from the authorization subject. In other words, in the embodiments of the present disclosure, for life cycle management operation types authorized by the authorization subject for the first VNF instance, a resource operation may be directly requested from the VIM provided that a subsequently requested operation type falls within the types authorized by the authorization subject, and there is no need to request authorization from the authorization subject and request the resource operation from the VIM after authorization is obtained. Therefore, load of the authorization subject can be reduced, a time for processing the life cycle management operation request is shortened, and service processing efficiency is improved.

DESCRIPTION OF EMBODIMENTS

Embodiments of the present disclosure provide a life cycle management method and an apparatus in order to resolve a problem that an authorization subject has relatively heavy load because the authorization subject needs to be applied to for authorization of each life cycle management operation.

To make the objectives, technical solutions, and advantages of the embodiments of the present disclosure clearer, the following clearly and describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Term "and/or" in this specification describes only an association relationship for describing associated objects and represents that three relationships may exist. For example, A and/or B may represent the three cases, only A exists, both A and B exist, and only B exists. In addition, the character "/" in this specification generally indicates an "or" relationship between the associated objects.

In addition, terms "first" and "second" in this specification are merely for ease of description, are used to distinguish between different VNFs or different VNF instances, and do not have technical meanings.

In the following, the implementation manners of the present disclosure are described in detail with reference to the accompanying drawings.

Figure 1:
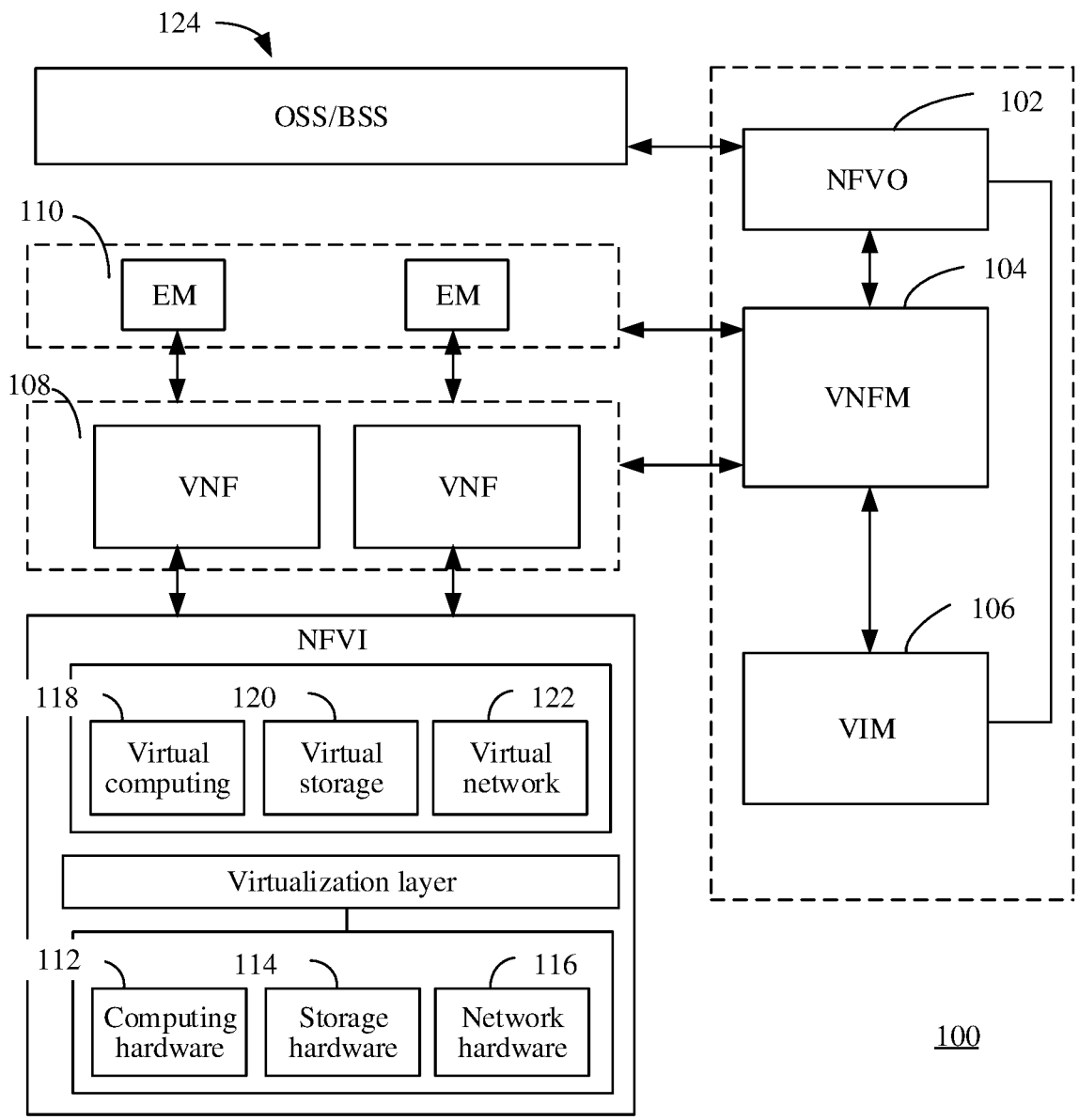
FIG. 1 is an architectural diagram of an NFV system.
Figure 2:
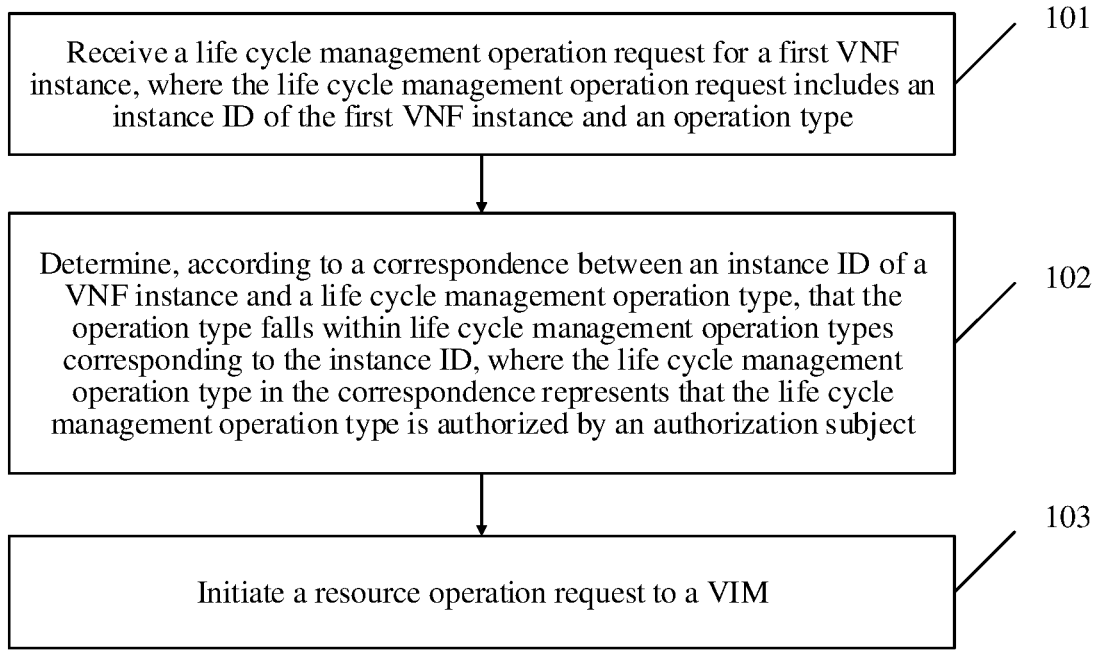
FIG. 2 is a flowchart of a life cycle management method according to an embodiment of the present disclosure.

Referring to FIG. 2, FIG. 2 is a flowchart of a life cycle management method according to an embodiment of the present disclosure. A network system to which the method may be applied is, for example, an NFV system 100 shown in FIG. 1. An execution body of the method may be a VNFM 104 shown in FIG. 1. The method includes the following content.

Step 101: Receive a life cycle management operation request for a first VNF instance, where the life cycle management operation request includes an instance ID of the first VNF instance and an operation type.

Step 102: Determine, according to a correspondence between an instance ID of a VNF instance and a life cycle management operation type, that the operation type falls within life cycle management operation types corresponding to the instance ID, where the life cycle management operation type in the correspondence represents that the life cycle management operation type is authorized by an authorization subject.

Step 103: Initiate a resource operation request to a VIM, where the resource operation request includes the instance ID.

In step 101, the life cycle management operation request may be sent by an EM, or sent by an OSS and/or a BSS. The operation type may include query, scale-in, scale-out, healing, migration, software update, and disablement.

A format of the request may be:
  Scale out: //the operation type is scale-out;
  VNF: VNF 1 instance ID //instance ID of a VNF 1;
  Resource: //resource required for scale-out;
  CPU: 4 //four CPUs;
  Memory: 4 GB //4 gigabytes (GB) memory.

The authorization subject is, for example, an NFVO 102. The correspondence is, for example, stored in the VNFM 104. In step 102, matching is performed in the correspondence using the instance ID of the first VNF instance, and the life cycle management operation types corresponding to the instance ID include the operation type in step 101.

For example, it is assumed that the operation type in step 101 is scale-out, and authorized operation types corresponding to the instance ID of the first VNF instance include query, scale-in, scale-out, healing, and software update. It can be learned that the requested operation type in step 101 falls within the authorized operation types, and therefore step 103 may be directly performed subsequently.

In step 103, the resource operation request is initiated to the VIM. The resource operation request includes the instance ID. The resource operation request is used to enable the VIM to perform a resource operation corresponding to the operation type on the first VNF instance. Further, if the operation type in step 101 is not disablement but an operation in which a resource needs to be requested, the request may further include resource information of the resource required for the operation type, for example, four CPUs and 4 GB memory are required. The VIM in this embodiment is, for example, a VIM 106 in FIG. 1.

It can be learned that the execution body of the method shown in FIG. 2 can obtain the correspondence between the instance ID and the life cycle management operation type. Therefore, a resource operation may be directly requested from the VIM provided that the operation type in the life cycle management operation request falls within the authorized operation types corresponding to the instance ID of the first VNF instance, and there is no need to send an authorization request to the authorization subject. Therefore, load of the authorization subject is reduced, a time for processing the operation request is shortened, and service processing efficiency is improved.

Optionally, after step 103, a resource update success response sent by the VIM is received. Then, the first VNF instance is configured based on an updated resource, for example, a service script is run on the updated resource.

Optionally, after the first VNF instance is configured, notification information is sent to the authorization subject in order to notify the authorization subject that a life cycle management operation is performed on the first VNF instance and of information about a resource currently occupied by the first VNF instance. The notification information includes an operation type of the life cycle management operation, and the information about the resource currently occupied by the first VNF instance. For example, a format of the notification information may be:
  Notification: //notification;
  Operation: scale out //the operation type is scale-out;
  Resource: //resource information;
  CPU: 4 //four CPUs;
  Memory: 4 GB //4 GB memory.

It should be noted that when the operation type in step 101 does not fall within the authorized operation types, an authorization request is sent to the authorization subject in order to request the authorization subject to authorize the operation type in step 101. Content of this part is well known by a person skilled in the art, and therefore details are not described herein.

The following describes in detail a process of generating the correspondence in step 102.

In a possible implementation manner, before step 101, the method further includes sending a proxy authorization request to the authorization subject, where the proxy authorization request is used to request the authorization subject to authorize a life cycle management operation of the first VNF instance, receiving proxy authorization policy information sent by the authorization subject, where the proxy authorization policy information is used to indicate a type of an authorized life cycle management operation, and generating the correspondence based on the instance ID and the proxy authorization policy information.

Further, the proxy authorization request may be included in an instantiation request. The instantiation request includes an ID of a VNFD of a VNF corresponding to the first VNF instance in order to obtain the first VNF instance. The instantiation request further includes the proxy authorization request. The proxy authorization request is used to request the authorization subject to authorize another life cycle management operation other than instantiation of the first VNF instance. For example, a format of the instantiation request may be:
  Grant lifecycle operation: //representing that the message is a life cycle management authorization request;
  VNF: VNFD ID //representing VNF information related to the request, and in this embodiment, representing the ID of the VNFD of the VNF corresponding to the first VNF instance;

Operation: instantiate //a life cycle management operation related to the request is an instantiation operation;

Required resource: //resource required for the instantiation operation;

CPU: 2 //two CPUs;

Memory: 2 GB //2 GB memory;

Delegation: active //the proxy authorization request, which requests authorization of another life cycle management operation other than instantiation.

Certainly, in actual application, the proxy authorization request only needs to be sent before step 101. When the proxy authorization request is sent before the instantiation request is sent, the proxy authorization request is used to request the authorization subject to authorize all life cycle management operations of the first VNF instance. When the proxy authorization request is sent after the first VNF instance is obtained, the proxy authorization request is used to request the authorization subject to authorize another life cycle management operation other than instantiation of the first VNF instance.

In the two cases, the proxy authorization request includes the ID of the VNFD of the VNF corresponding to the first VNF instance such that the authorization subject determines an operation type on which proxy authorization is allowed to be performed for the first VNF instance.

The received proxy authorization policy information is used to indicate the type of the authorized life cycle management operation. Therefore, in actual application, the proxy authorization policy information may be indication information, and may list an operation type on which proxy authorization is allowed to be performed, or an operation type on which proxy authorization is not allowed to be performed. The indication information is, for example, "full delegated," which indicates that proxy authorization is allowed to be performed on all life cycle management operation types.

After the proxy authorization policy information is received, the correspondence may be generated based on the instance ID of the first VNF instance and the proxy authorization policy information. The correspondence may be stored in a form of a table. Alternatively, the proxy authorization policy information may be written in attribute information of the first VNF instance.

In this embodiment, in one authorization process, the authorization subject simultaneously authorizes multiple operation types to the execution body of the method shown in FIG. 2, for example, the VNFM 104. Therefore, load of the authorization subject can be greatly reduced, and message interaction between the authorization subject and the VNFM 104 can also be reduced.

In actual application, the present disclosure does not exclude a manner of authorizing multiple operation types for multiple times. For example, after a life cycle management operation request is received for the first time, the authorization subject is applied to for authorization. If the authorization subject allows proxy authorization, in addition to continuing to execute an authorization procedure, the authorization subject returns proxy authorization policy information to the VNFM 104, where the proxy authorization policy information indicates that the VNFM 104 is allowed to perform proxy authorization on an operation type in the life cycle management operation request. If an operation request of the operation type is received for the second time, a resource may be directly requested from the VIM, and there is no need to request authorization from the authorization subject. Compared with a solution in which authorization needs to be requested from the authorization subject each time when an operation request of a same type is received, this can reduce load of the authorization subject, and reduce message interaction between the authorization subject and the VNFM 104. After authorization of all life cycle management operations is requested from the authorization subject once, all operation types on which proxy authorization is allowed to be performed may be obtained, and further the correspondence is generated.

In another possible implementation manner of the correspondence in step 102, the correspondence is predetermined or agreed upon, or is determined by a third-party subject and then delivered to the authorization subject and the execution body of the method shown in FIG. 2.

The following describes a process of generating proxy authorization policy information from a perspective of an authorization subject. For details, refer to FIG. 3. The method includes the following steps.

Step 201: Receive a proxy authorization request sent by a VNFM, where the proxy authorization request is used to request to authorize a life cycle management operation of a first VNF instance.

Step 202: Obtain a VNFD of a VNF corresponding to the first VNF instance.

Step 203: Determine, according to a dependency relationship and/or a location relationship between the VNF and another VNF that are/is described in the VNFD, an operation type on which proxy authorization can be performed and that falls within all life cycle management operation types for the first VNF instance, where the operation type is an operation type that does not affect the dependency relationship and/or the location relationship.

Step 204: Send proxy authorization policy information to the VNFM, where the policy information is used to indicate the operation type.

Further, in step 202 of obtaining a VNFD of a VNF corresponding to the first VNF instance, manners of obtaining the VNFD are slightly different according to different occasions for sending the proxy authorization request in step 201. For example, in step 201, when the proxy authorization request is carried in an instantiation request used to obtain the first VNF instance, the instantiation request carries an ID of the VNFD of the VNF, and therefore the authorization subject may obtain the VNFD according to the ID of the VNFD. If the proxy authorization request is sent after the first VNF instance is successfully instantiated, the proxy authorization request may carry an instance ID of the first VNF instance, and therefore the authorization subject may obtain the VNFD of the corresponding VNF according to the instance ID.

In the VNFD, the dependency relationship and/or the location relationship between the VNF and the other VNF are/is described. The dependency relationship between the VNF and the other VNF means that normal running of the VNF depends on normal running of the other VNF, or normal running of the other VNF depends on normal running of the VNF. The dependency relationship further includes whether the VNF and the other VNF are managed by a same VNFM.

The location relationship between the first VNF and the other VNF means that the first VNF and an instance of the other VNF need to be deployed on a same physical host, or the first VNF and an instance of the other VNF cannot be simultaneously deployed on a same physical host.

In step 203, the operation type on which proxy authorization can be performed and that falls within all the life cycle management operation types for the first VNF instance may be determined according to the dependency relationship, or the operation type on which proxy authorization can be performed and that falls within all the life cycle management operation types for the first VNF instance may be determined according to the location relationship. Alternatively, the operation type on which proxy authorization can be performed and that falls within all the life cycle management operation types for the first VNF instance may be determined with reference to both the dependency relationship and the location relationship.

All the life cycle management operation types for the first VNF instance refer to all life cycle management operation types that can be supported by the first VNF instance, for example, query, scale-in, scale-out, healing, migration, software update, and disablement.

It should be noted that the determined operation type is an operation type that does not affect the dependency relationship and/or the location relationship. That the operation type is an operation type that does not affect the dependency relationship and/or the location relationship includes that the other VNF that depends on the VNF can still normally run after an operation corresponding to the operation type is performed on the first VNF instance, and/or the first VNF and the instance of the other VNF do not have a location exclusion relationship after an operation corresponding to the operation type is performed on the first VNF instance.

In a possible implementation manner, step 203 includes determining that the operation type on which proxy authorization can be performed is another life cycle management operation type other than disablement and scale-in when the normal running of the other VNF depends on the VNF, and the other VNF and the VNF are managed by different VNFMs, determining that the operation type on which proxy authorization can be performed is all life cycle management operation types when the normal running of the other VNF depends on the VNF, and both the other VNF and the VNF are managed by the VNFM, or determining that the operation type on which proxy authorization can be performed is another life cycle management operation type other than migration when the VNF and the other VNF have the location relationship.

The following uses an example to describe how to determine the operation type according to the dependency relationship and/or the location relationship.

Figure 4A:
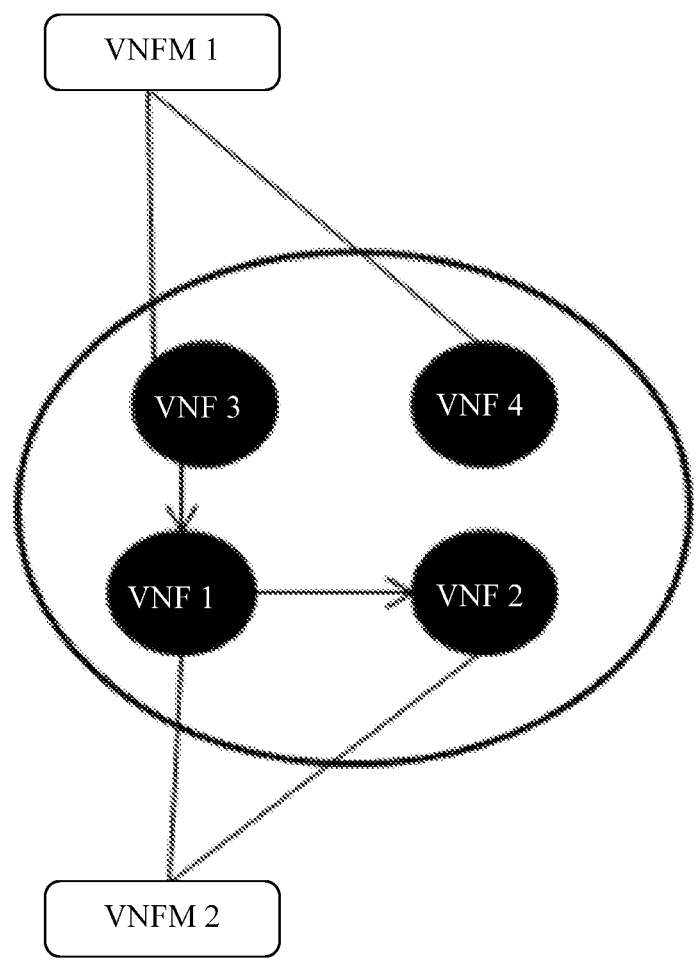
FIG. 4A and FIG. 4B are schematic diagrams of a dependency relationship and a location relationship between VNFs according to an embodiment of the present disclosure.

As shown in FIG. 4A, a VNF 1 and a VNF 2 are managed by a VNFM 2. A VNF 3 and a VNF 4 are managed by a VNFM 1. The VNF 1 depends on the VNF 2, that is, normal running of the VNF 1 depends on running of the VNF 2. For example, the VNF 2 needs to exist, and an amount of resources needs to be greater than a specified value, for example, two CPUs and 2 GB memory. Therefore, when the VNF 2 is disabled or scaled in, running of the VNF 1 is inevitably affected. The VNF 3 depends on the VNF 1, that is, normal running of the VNF 3 depends on the normal running of the VNF 1.

It is assumed that the first VNF instance in this embodiment is an instance of the VNF 2. Because the VNF 1 depends on the VNF 2, the running of the VNF 1 is inevitably affected when the first VNF instance is disabled or scaled in. However, both the VNF 1 and the VNF 2 are managed by the VNFM 2, and therefore the VNFM 2 may perform an operation according to the dependency relationship when the operation type for the first VNF instance is disablement or scale-in. For example, the VNF 1 is also scaled in when the first VNF instance is scaled in. Therefore, in step 203, the operation type on which proxy authorization can be performed and that falls within all the life cycle management operation types for the first VNF instance is query, scale-in, scale-out, healing, software update, migration, and disablement. That is, when these operations are subsequently performed on the first VNF instance, there is no need to request authorization from the authorization subject, and a resource may be directly requested from a VIM.

In this case, after step 102, the method further includes obtaining a VNFD of the VNF corresponding to the first VNF instance, determining, according to the VNFD, whether normal running of the other VNF depends on normal running of the VNF, where the other VNF and the VNF are managed by a same VNFM, and determining whether the operation type in step 101 affects the normal running of the other VNF, and if the operation type in step 101 affects the normal running of the other VNF, initiating an operation related to the operation type for the instance of the other VNF. For example, when the operation type in step 101 is scale-in, a scale-in operation is also performed on the other VNF such that the dependency relationship between the other VNF and the VNF remains unchanged, and the other VNF does not fail to normally run due to a result of managing the first VNF instance.

It is assumed that the first VNF instance in this embodiment is an instance of the VNF 1. Because the VNF 3 depends on the VNF 1, and the VNF 1 and the VNF 3 are managed by different VNFMs, when the VNFM 2 performs a disablement or scale-in operation on the instance of the VNF 1, that is, the first VNF instance, the VNFM 1 cannot learn a related operation, and running of the VNF 3 is inevitably affected. In this case, because all VNFMs are managed by an NFVO, when needing to perform a disablement or scale-in operation on the VNF 1, the VNFM 2 needs to first apply to the NFVO for authorization. Therefore, in this case, the NFVO cannot allow the VNFM 2 to perform proxy authorization on all life cycle management operation types. As a result, determined operation types that can be authorized include query, scale-out, healing, software update, and migration.

Figure 4B:
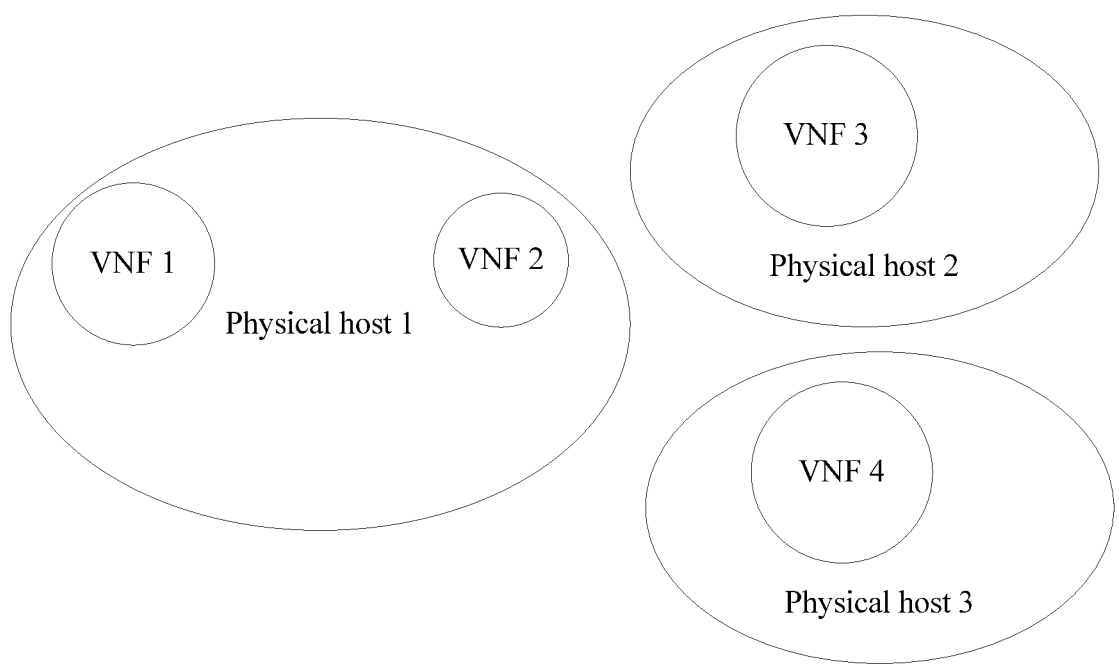

As shown in FIG. 4B, in this embodiment, there is a location dependency relationship between a VNF 1 and a VNF 2, that is, an instance of the VNF 1 and an instance of the VNF 2 are required to be deployed on a same physical host. There is a location exclusion relationship between a VNF 3 and a VNF 4, that is, the VNF 3 and the VNF 4 are required to be deployed on different physical hosts.

Because there is the location dependency relationship between the VNF 1 and the VNF 2, migration operations for the instances of the VNF 1 and the VNF 2 may cause a change to the location dependency relationship between the VNF 1 and the VNF 2. Therefore, authorization of the migration operations needs to be requested from the authorization subject. Similarly, migration operations for instances of the VNF 3 and the VNF 4 may also cause a change to the location exclusion relationship between the VNF 3 and the VNF 4. Therefore, authorization of the migration operations also needs to be requested from the authorization subject. Therefore, in step 203, the determined operation type on which proxy authorization is allowed to be performed includes query, scale-in, scale-out, healing, software update, and disablement, and does not include a migration operation.

After the operation type on which proxy authorization is allowed to be performed is determined in step 203, the proxy authorization policy information is generated, and the proxy authorization policy information is sent to the VNFM. The proxy authorization policy information is used to indicate the operation type.

In a further embodiment, in process of instantiating the first VNF instance, a query request is further sent to the VIM according to the location relationship, for example, a location dependency relationship or a location exclusion relationship in order to request an ID of a physical host on which an instance of a second VNF that has the location relationship with the VNF corresponding to the first VNF instance is deployed. The query request includes an instance ID of the instance of the second VNF.

The VIM obtains, by means of querying according to the instance ID of the instance of the second VNF, the ID of the physical host on which the instance of the second VNF is deployed, and returns the ID of the physical host to the authorization subject.

Then, the authorization subject sends the ID of the physical host to the VNFM.

Optionally, the ID of the physical host and the proxy authorization policy information are sent to the VNFM by being carried in a same message. For example, the format of the message is:

Grant Type: Partial delegated {Scale-up/out, Scale-in/down, Query, heal, update} //a grant type is partial delegated, and operation types on which proxy authorization is allowed to be performed are scale-out, scale-in, query, healing, software update, and disablement;

Available Policies: //available policies;

Affinity {Host ID} //location dependency relationship: an ID of a physical host;

Anti-affinity {Host ID} //location exclusion relationship: an ID of a physical host.

After receiving the ID of the physical host, the VNFM sends the ID of the physical host and the location relationship to the VIM such that the VIM allocates a resource to the first VNF instance based on the ID of the physical host and the location relationship.

Further, if the physical host is a physical host corresponding to the location dependency relationship, the VIM allocates, on the physical host, a resource to the first VNF instance. If the physical host is a physical host corresponding to the location exclusion relationship, the VIM chooses to allocate, on another physical host other than the physical host, a resource to the first VNF instance.

Figure 5A:
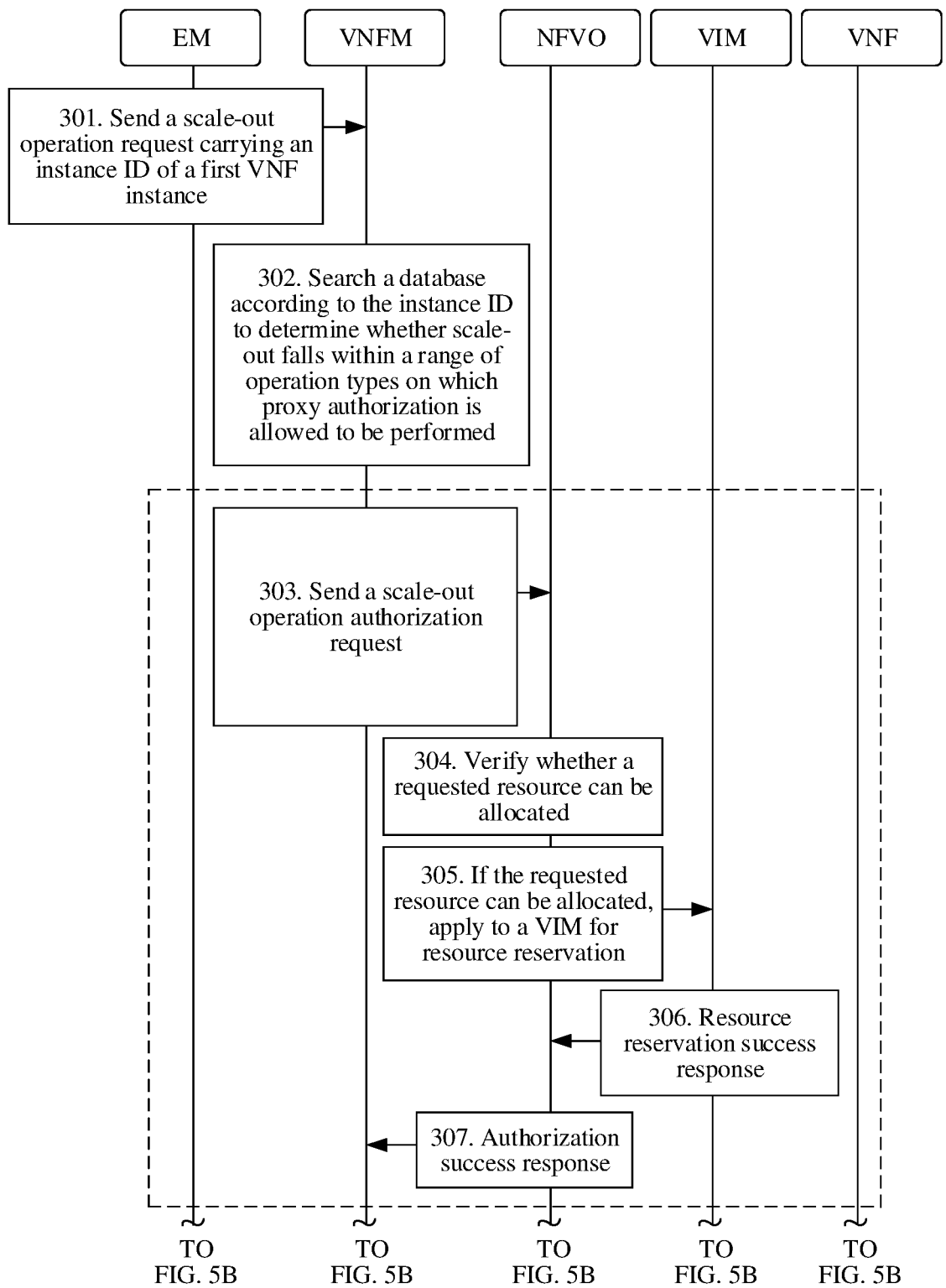
FIG. 5A and FIG. 5B are an instance interaction diagram of a life cycle management method according to an embodiment of the present disclosure.
Figure 5B:
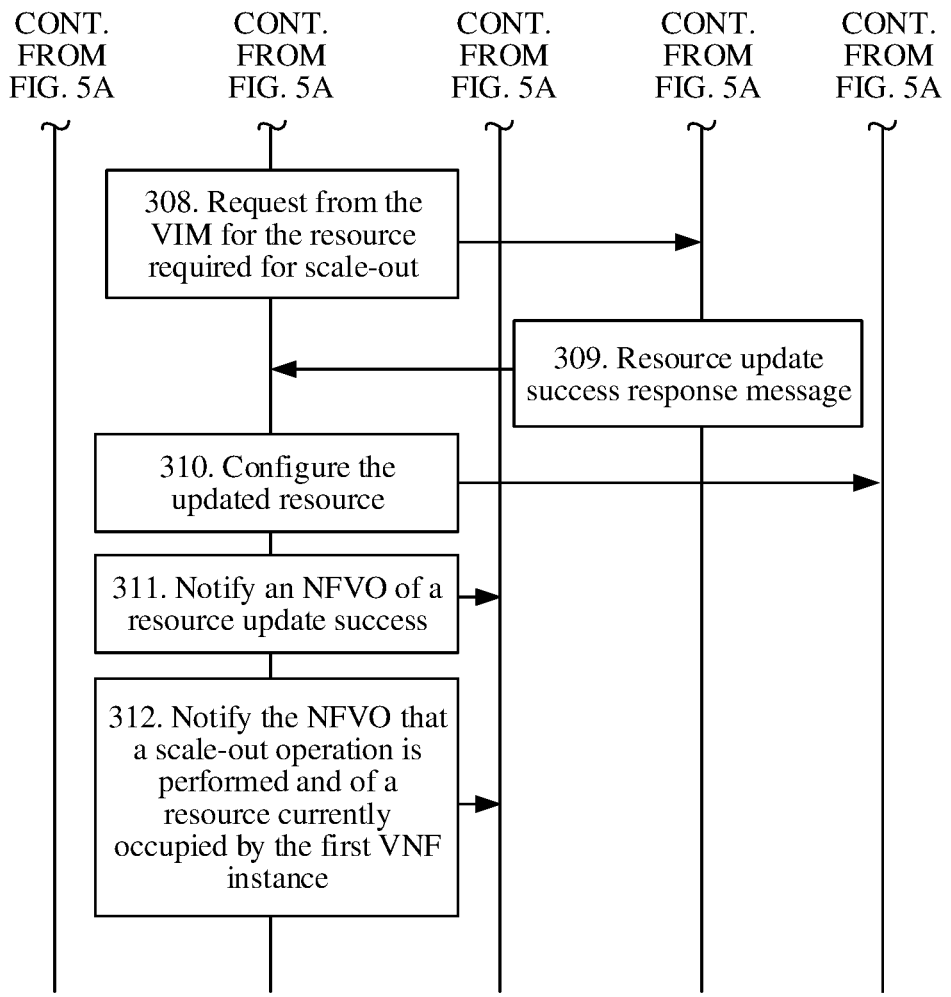

The following uses a specific example to describe a process of implementing a life cycle management method according to an embodiment of the present disclosure. Referring to FIG. 5A and FIG. 5B, the method includes the following steps.

Step 301: An EM sends a scale-out operation request to a VNFM, where the request carries an instance ID of a first VNF instance. A format of the request is:

Scale out: //an operation type is scale-out;

VNF: VNF 2 instance ID //instance ID of the first VNF instance that is an instance of a VNF 2;

Resource: //resource required for scale-out;

CPU: 4 //four CPUs;

Memory: 4 GB //4 GB memory.

Step 302: The VNFM searches a database according to the instance ID to determine whether scale-out falls within a range of operation types on which proxy authorization is allowed to be performed. If scale-out does not fall within the range of operation types on which proxy authorization is allowed to be performed, perform step 303 to step 311. If scale-out falls within the range of operation types on which proxy authorization is allowed to be performed, perform step 308 to step 310, and step 312.

Step 303: The VNFM sends a scale-out operation authorization request to an NFVO. For example, a format of the request is:

Grant lifecycle operation: //representing that the message is a life cycle management authorization request;

VNF: VNF 2 instance ID //instance ID of the first VNF instance;

Operation: scale out //a life cycle management operation related to the request is a scale-out operation;

Required resource: //information about a resource required for the scale-out operation;

CPU: 4 //four CPUs;

Memory: 4 GB //4 GB memory.

Step 304: The NFVO verifies whether the requested resource can be allocated. If the requested resource can be allocated, perform step 305.

Step 305: If the requested resources can be allocated, the NFVO applies to a VIM for resource reservation.

Step 306: The VIM returns a resource reservation success response to the NFVO.

Step 307: The NFVO returns an authorization success response to the VNFM.

Step 308: The VNFM requests, from the VIM, the resource required for scale-out.

Step 309: The VIM sends a resource update success response message to the VNFM.

Step 310: The VNFM configures the updated resource, for example, runs a service script on the updated resource.

Step 311: The VNFM notifies the NFVO of a resource update success.

Step 312: The VNFM notifies the NFVO that a scale-out operation is performed and of information about a resource currently occupied by the first VNF instance. For example, a format of the notification message is:

Notification: //representing that the message is a notification message;

Operation: scale out //representing that an executed life cycle management operation is a scale-out operation;

Resource: //the information about the resource occupied by the first VNF instance;

CPU: 4 //four CPUs;

Memory: 4 GB //4 GB memory.

Step 303 to step 311 are procedures in other approaches, and are well known by a person skilled in the art, and therefore details are not described.

It can be learned from this embodiment that when a requested operation type in step 301 is an operation type on which a VNFM can perform proxy authorization, step 308 to step 310, and step 312 are directly performed, and step 303 to step 307 are omitted. Therefore, load of an NFVO is greatly reduced, a time for processing a life cycle management operation is shortened, and service processing efficiency is improved.

Figure 6:
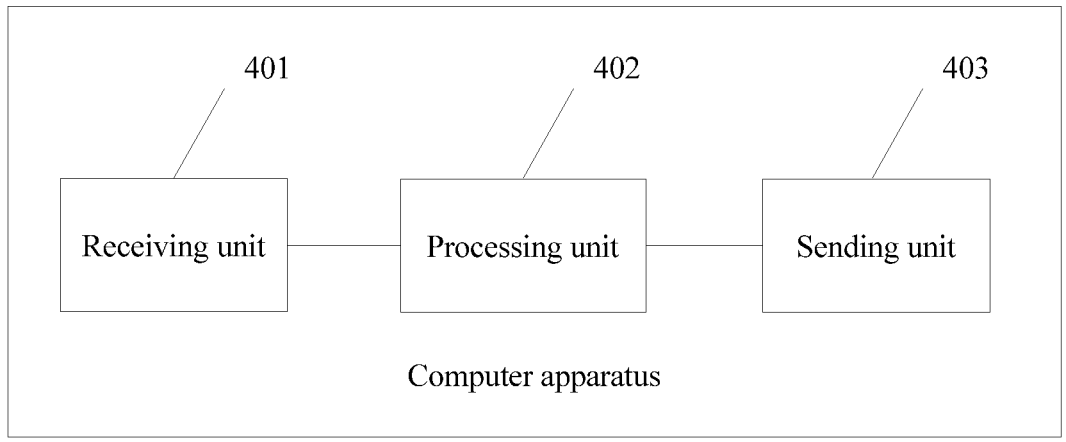
FIG. 6 is a simplified functional block diagram of a computer apparatus according to an embodiment of the present disclosure.

FIG. 6 is a simplified functional block diagram of a computer apparatus according to an embodiment of the present disclosure. The computer apparatus includes a receiving unit 401, a processing unit 402, and a sending unit 403.

It should be noted that the computer apparatus is presented in a form of a functional unit. Without limitation, the term "unit" used in this specification may refer to an application-specific integrated circuit (ASIC), an electronic circuit, a (shared, dedicated, or group) processor, and a memory that execute one or more software or firmware programs, a combinational logic circuit, and/or another appropriate component that provides the function.

Figure 3:
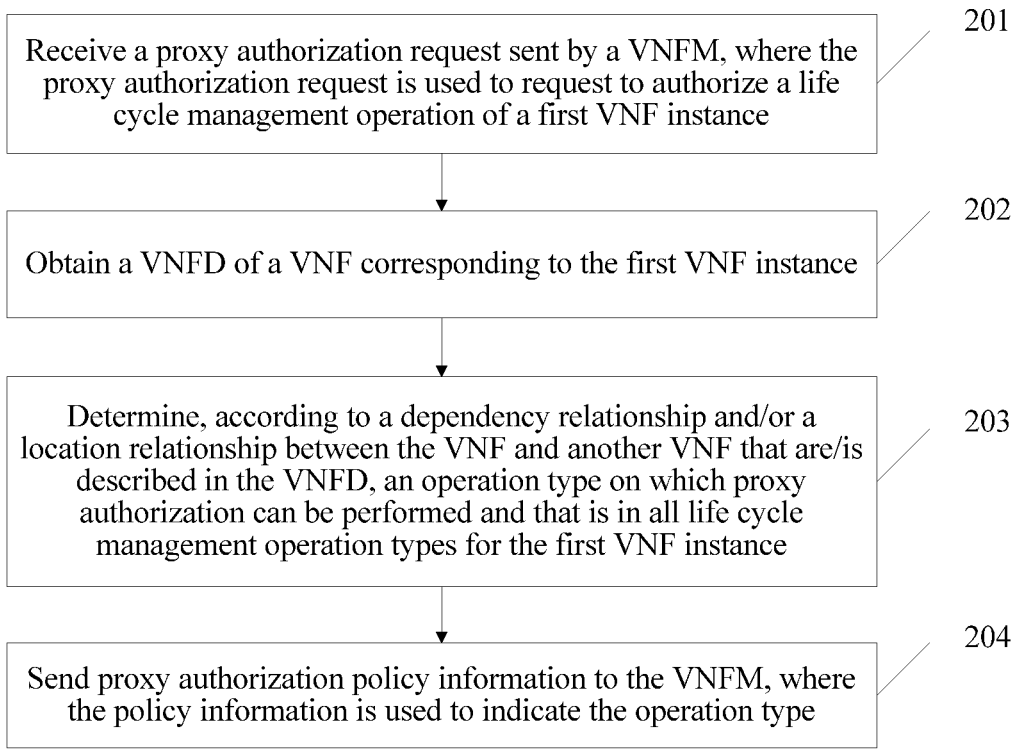
FIG. 3 is a flowchart of a proxy authorization policy determining method according to an embodiment of the present disclosure.

Optionally, the computer apparatus is configured to implement the methods/method shown in FIG. 2 and/or FIG. 3. Specific configurations may be determined according to actual requirements.

Further, when the computer apparatus is configured to implement the life cycle management method shown in FIG. 2 of the present disclosure, the receiving unit 401 is configured to receive a life cycle management operation request for a first VNF instance, where the life cycle management operation request includes an instance ID of the first VNF instance and an operation type. The processing unit 402 is configured to determine, according to a correspondence between an instance ID of a VNF instance and a life cycle management operation type, that the operation type falls within life cycle management operation types corresponding to the instance ID, where the life cycle management operation type in the correspondence represents that the life cycle management operation type is authorized by an authorization subject, and the sending unit 403 is configured to initiate a resource operation request to a VIM, where the resource operation request includes the instance ID such that the VIM performs, according to the instance ID, a resource operation corresponding to the operation type on the first VNF instance.

Optionally, the sending unit 403 is further configured to send a proxy authorization request to the authorization subject before the receiving unit 401 receives the life cycle management operation request for the first VNF instance, where the proxy authorization request is used to request the authorization subject to authorize all life cycle management operations of the first VNF instance. The receiving unit 401 is further configured to receive proxy authorization policy information sent by the authorization subject, where the proxy authorization policy information is used to indicate a type of an authorized life cycle management operation, and the processing unit 402 is further configured to generate the correspondence based on the instance ID and the proxy authorization policy information.

Optionally, the sending unit 403 is further configured to send an instantiation request to the authorization subject before the receiving unit 401 receives the life cycle management operation request for the first VNF instance, where the instantiation request further includes a proxy authorization request, and the proxy authorization request is used to request the authorization subject to authorize another life cycle management operation other than instantiation of the first VNF instance.

Optionally, the receiving unit 401 is further configured to receive a location relationship and an ID of a physical host corresponding to the location relationship that are sent by the authorization subject after the sending unit 403 sends the instantiation request to the authorization subject, where the location relationship is a location relationship between the first VNF instance and an instance of another VNF, and the sending unit 403 is further configured to send the ID of the physical host to the VIM such that the VIM allocates a resource to the first VNF instance based on the ID of the physical host and the location relationship.

Optionally, after determining that the operation type falls within the life cycle management operation types corresponding to the instance ID, the processing unit 402 is further configured to obtain a VNFD of the VNF corresponding to the first VNF instance, determine, according to the VNFD, that normal running of the other VNF depends on normal running of the VNF, where the other VNF and the VNF are managed by a same VNFM, and initiate an operation related to the operation type for the instance of the other VNF.

Further, when the computer apparatus is configured to implement the life cycle management method shown in FIG. 3 of the present disclosure, the receiving unit 401 is configured to receive a proxy authorization request sent by a VNFM, where the proxy authorization request is used to request to authorize a life cycle management operation of a first VNF instance. The processing unit 402 is configured to obtain a VNFD of a VNF corresponding to the first VNF instance, and determine, according to a dependency relationship and/or a location relationship between the VNF and another VNF that are/is described in the VNFD, an operation type on which proxy authorization can be performed and that falls within all life cycle management operation types for the first VNF instance, where the operation type is an operation type that does not affect the dependency relationship and/or the location relationship, and the sending unit 403 is configured to send proxy authorization policy information to the VNFM, where the policy information is used to indicate the operation type.

Optionally, the proxy authorization request is carried in an instantiation request used to obtain the first VNF instance, and the proxy authorization request is used to request to authorize another life cycle management operation other than instantiation of the first VNF instance.

Optionally, the sending unit 403 is further configured to send a query request to a VIM according to the location relationship after the receiving unit 401 receives the instantiation request in order to request an ID of a physical host on which an instance of a second VNF that has the location relationship with the VNF is deployed, where the query request includes an instance ID of the instance of the second VNF. The receiving unit 401 is further configured to receive the ID of the physical host that is sent by the VIM, and the sending unit 403 is further configured to provide the ID of the physical host and the location relationship for the VIM using the VNFM. Further, providing the ID of the physical host and the location relationship for the VIM using the VNFM includes that the ID of the physical host and the location relationship are sent to the VNFM, and the VNFM sends the ID of the physical host and the location relationship to the VIM. Then, the VIM allocates a resource to the first VNF instance based on the ID of the physical host and the location relationship.

Optionally, the processing unit 402 is configured to determine that the operation type on which proxy authorization can be performed is another life cycle management operation type other than disablement and scale-in when normal running of the other VNF depends on the VNF, and the other VNF and the VNF are managed by different VNFMs, determine that the operation type on which proxy authorization can be performed is all life cycle management operation types when normal running of the other VNF depends on the VNF, and both the other VNF and the VNF are managed by the VNFM, or determine that the operation type on which proxy authorization can be performed is another life cycle management operation type other than migration when the VNF and the other VNF have the location relationship.

The various types of variations and specific instances in the life cycle management method and the proxy authorization determining method in the embodiments shown in FIG. 2 and FIG. 3 are also applicable to the computer apparatus in this embodiment. With the foregoing detailed descriptions of the life cycle management method and the proxy authorization determining method, a person skilled in the art can clearly understand an implementation method of the computer apparatus in this embodiment. Therefore, for brevity of the specification, details are not described herein.

Figure 7:
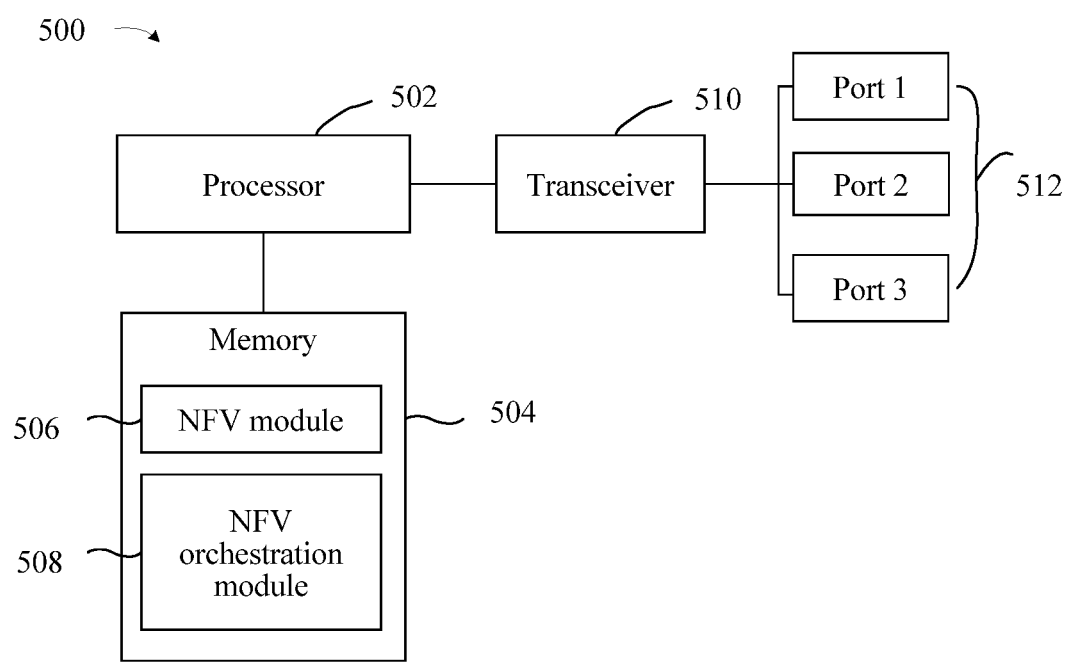
FIG. 7 is a schematic structural diagram of a network element according to an embodiment of the present disclosure.

FIG. 7 shows a schematic structural diagram of a network element 500 according to an embodiment of the present disclosure. The network element 500 is configured to transfer or process data in the NFV system 100 shown in FIG. 1. The network element 500 is configured to create, modify, relocate and/or migrate one or more virtual machines. The network element 500 may be further configured to host, store, and/or execute one or more network functions. The network element 500 may be a sub-component in the NFV system 100 in FIG. 1, for example, the NFVO 102 or the VNFM 104.

The network element 500 may include one or more ports 512 (designated as port 1, port 2 and port 3) coupled to a transceiver 510. The transceiver 510 may be a transmitter, a receiver, or a combination of a transmitter and a receiver, and send or receive a data packet to or from another network node using the one or more ports 512. A processor 502 is coupled to the transceiver 510, and is configured to process a data packet, and determine nodes that send data packets. The processor 502 may include one or more multi-core processors and/or memories 504. The processor 502 may be a general purpose processor, an ASIC, or a digital signal processor (DSP).

The memory 504 may be a non-transitory storage medium, is coupled to the processor 502, and is configured to store different types of data. The memory 504 may include a read-only memory (ROM), a random access memory (RAM), or another type of dynamic storage device that can store information and an instruction, or may be a disk memory. The memory 504 may be configured to store an instruction used to implement an NFV system or a related method, for example, serve as the VNFM 104, the VNF 108, or the NFVO 102. In an implementation manner, the memory 504 may include an NFV module 506, and the NFV module 506 may be executed on the processor 502. The NFV module 506 may be configured to host, store, and implement network functions of one or more virtualized network devices. In another implementation manner, the memory 504 may further include an NFV orchestration module 508 configured to create, modify, relocate, and/or migrate one or more virtual machines. It may be understood that the network element 500 may be converted into a specific device such as a router or a switch by programming or loading an executable instruction onto at least one of the processor 502, a cache, or a long-term storage of the network element 500.

The network element 500 may implement functions of one or more VNFs, and execute one or more instructions according to this embodiment of the present disclosure. These instructions may be stored in the memory 504, or may be integrated into a kernel of an operating system of the network element 500 or a plug-in of a kernel.

Optionally, the network element 500 may implement the methods/method shown in FIG. 2 and/or FIG. 3. Specific configurations may be determined according to actual requirements.

Further, when the network element 500 is configured to implement the life cycle management method shown in FIG. 2, and when the processor 502 executes the instruction, the instruction enables the network element 500 to perform the operations of receiving a life cycle management operation request for a first VNF instance using the transceiver 510, where the life cycle management operation request includes an instance ID of the first VNF instance and an operation type, determining, according to a correspondence between an instance ID of a VNF instance and a life cycle management operation type, that the operation type falls within life cycle management operation types corresponding to the instance ID, where the life cycle management operation type in the correspondence represents that the life cycle management operation type is authorized by an authorization subject, and initiating a resource operation request to a VIM using the transceiver 510, where the resource operation request includes the instance ID such that the VIM performs, according to the instance ID, a resource operation corresponding to the operation type on the first VNF instance.

Optionally, when the processor 502 executes the instruction, the instruction enables the network element 500 to further perform the operations of sending a proxy authorization request to the authorization subject using the transceiver 510 before receiving the life cycle management operation request for the first VNF instance using the transceiver 510, where the proxy authorization request is used to request the authorization subject to authorize all life cycle management operations of the first VNF instance, receiving, using the transceiver 510, proxy authorization policy information sent by the authorization subject, where the proxy authorization policy information is used to indicate a type of an authorized life cycle management operation, and generating the correspondence based on the instance ID and the proxy authorization policy information.

Optionally, when the processor 502 executes the instruction, the instruction enables the network element 500 to further perform the operation of sending an instantiation request to the authorization subject using the transceiver 510 before receiving the life cycle management operation request for the first VNF instance using the transceiver 510, where the instantiation request further includes a proxy authorization request, and the proxy authorization request is used to request the authorization subject to authorize another life cycle management operation other than instantiation of the first VNF instance.

Optionally, when the processor 502 executes the instruction, the instruction enables the network element 500 to further perform the operations of receiving, using the transceiver, a location relationship and an ID of a physical host corresponding to the location relationship that are sent by the authorization subject after sending the instantiation request to the authorization subject using the transceiver 510, where the location relationship is a location relationship between the first VNF instance and an instance of another VNF, and sending the ID of the physical host to the VIM using the transceiver 510 such that the VIM allocates a resource to the first VNF instance based on the ID of the physical host and the location relationship.

Optionally, when the processor 502 executes the instruction, the instruction enables the network element 500 to further perform the operations of obtaining a VNFD of the VNF corresponding to the first VNF instance after determining that the operation type falls within the life cycle management operation types corresponding to the instance ID, determining, according to the VNFD, that normal running of the other VNF depends on normal running of the VNF, where the other VNF and the VNF are managed by a same VNFM, and initiating an operation related to the operation type for the instance of the other VNF.

Further, when the network element 500 is configured to implement the proxy authorization policy determining method shown in FIG. 3 of the present disclosure, and when the processor 502 executes the instruction, the instruction enables the network element 500 to perform the operations of receiving, using the transceiver 510, a proxy authorization request sent by a VNFM, where the proxy authorization request is used to request to authorize a life cycle management operation of a first VNF instance, obtaining a VNFD of a VNF corresponding to the first VNF instance, determining, according to a dependency relationship and/or a location relationship between the VNF and another VNF that are/is described in the VNFD, an operation type on which proxy authorization can be performed and that falls within all life cycle management operation types for the first VNF instance, where the operation type is an operation type that does not affect the dependency relationship and/or the location relationship, and sending proxy authorization policy information to the VNFM using the transceiver 510, where the policy information is used to indicate the operation type.

Optionally, the proxy authorization request is carried in an instantiation request used to obtain the first VNF instance, and the proxy authorization request is used to request to authorize another life cycle management operation other than instantiation of the first VNF instance.

Optionally, when the processor 502 executes the instruction, the instruction enables the network element 500 to further perform the operations of sending a query request to a VIM according to the location relationship after receiving the instantiation request using the transceiver 510 in order to request an ID of a physical host on which an instance of a second VNF that has the location relationship with the VNF is deployed, where the query request includes an instance ID of the instance of the second VNF, receiving, using the transceiver 510, the ID of the physical host that is sent by the VIM, and providing the ID of the physical host and the location relationship for the VIM using the VNFM. Further, the ID of the physical host and the location relationship are sent to the VNFM such that the VNFM sends the ID of the physical host and the location relationship to the VIM, and the VIM allocates a resource to the first VNF instance based on the ID of the physical host and the location relationship.

Optionally, the dependency relationship includes whether the VNF and the other VNF are managed by a same VNFM, and normal running of the other VNF depends on normal running of the VNF, or normal running of the VNF depends on normal running of the other VNF, and the location relationship is that the first VNF and an instance of the other VNF need to be deployed on a same physical host, or the first VNF and an instance of the other VNF cannot be simultaneously deployed on a same physical host.

Optionally, that the operation type is an operation type that does not affect the dependency relationship and/or the location relationship includes that the other VNF that depends on the VNF can still normally run after an operation corresponding to the operation type is performed on the first VNF instance, and/or the first VNF and the instance of the other VNF do not have a location exclusion relationship after an operation corresponding to the operation type is performed on the first VNF instance.

Optionally, when the processor 502 executes the instruction, the instruction enables the network element 500 to further perform the operation of determining that the operation type on which proxy authorization can be performed is another life cycle management operation type other than disablement and scale-in when the normal running of the other VNF depends on the VNF, and the other VNF and the VNF are managed by different VNFMs, determining that the operation type on which proxy authorization can be performed is all life cycle management operation types when the normal running of the other VNF depends on the VNF, and both the other VNF and the VNF are managed by the VNFM, or determining that the operation type on which proxy authorization can be performed is another life cycle management operation type other than migration when the VNF and the other VNF have the location relationship.

The various types of variations and specific instances in the life cycle management method and the proxy authorization determining method in the embodiments shown in FIG. 2 and FIG. 3 are also applicable to the network element 500 in this embodiment. With the foregoing detailed descriptions of the life cycle management method and the proxy authorization determining method, a person skilled in the art can clearly understand an implementation method of the network element 500 in this embodiment. Therefore, for brevity of the specification, details are not described herein.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc ROM (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A life cycle management method, comprising:
sending, by a virtualized network function manager (VNFM), an authorization request to a network function virtualization orchestrator (NFVO), wherein the authorization request requests the NFVO to authorize a plurality of life cycle management operations for a first virtualized network function (VNF) instance;
receiving, by the VNFM, authorization policy information from the NFVO, wherein the authorization policy information indicates types of a plurality of authorized life cycle management operations;
receiving, by the VNFM, a life cycle management operation request for the first VNF instance, wherein the life cycle management operation request comprises an instance identifier (ID) of the first VNF instance and an operation type;
determining, by the VNFM, according to the life cycle management operation request and the types of the plurality of authorized life cycle management operations, that the operation type in the life cycle management operation request falls within the types of the plurality of authorized life cycle management operations; and
sending a resource operation request to a virtualized infrastructure manager (VIM), wherein the resource operation request comprises the instance ID of the first VNF instance.

2. The method of claim 1, wherein before receiving the life cycle management operation request, the method further comprises generating a correspondence based on the instance ID of the first VNF instance and the authorization policy information.

3. The method of claim 1, wherein before receiving the life cycle management operation request, the method further comprises sending, by the VNFM, an instantiation request to the NFVO, and wherein the instantiation request comprises a authorization request that requests the NFVO to authorize another life cycle management operation other than instantiation of the first VNF instance.

4. The method of claim 3, wherein after sending the instantiation request to the NFVO, the method further comprises:
receiving, by the VNFM, a location relationship and an ID of a physical host corresponding to the location relationship from the NFVO, wherein the location relationship comprises a location relationship between the first VNF instance and an instance of another VNF; and
sending, by the VNFM, the ID of the physical host to the VIM.

5. The method of claim 1, wherein after determining that the operation type falls within the types of the plurality of authorized life cycle management operations, the method further comprises:
obtaining, by the VNFM, a VNF descriptor (VNFD) of a first VNF corresponding to the first VNF instance;
determining, by the VNFM, according to the VNFD, that running of another VNF depends on running of the first VNF, wherein the other VNF and the first VNF are managed by a same VNFM; and
initiating, by the VNFM, an operation related to an operation type for an instance of the other VNF.

6. An authorization policy determining method, comprising:
receiving, by a network function virtualization orchestrator (NFVO), an authorization request from a virtualized network function manager (VNFM), wherein the authorization request requests to authorize a plurality of life cycle management operations of a first virtualized network function (VNF) instance;
obtaining, by the NFVO, a VNF descriptor (VNFD) of a first VNF corresponding to the first VNF instance;
determining, by the NFVO, according to a dependency relationship or a location relationship between the first VNF and another VNF described in the VNFD, types of a plurality of authorized life cycle management operations for the first VNF, wherein the types of the plurality of authorized life cycle management operations do not affect the dependency relationship or the location relationship; and
sending, by the NFVO, authorization policy information to the VNFM, wherein the authorization policy information indicates the types of the plurality of authorized life cycle management operations.

7. The method of claim 6, wherein the authorization request is carried in an instantiation request used to obtain the first VNF instance, and wherein the authorization request requests to authorize a life cycle management operation other than instantiation of the first VNF instance.

8. The method of claim 7, wherein after receiving the authorization request, the method further comprises:
sending, by the NFVO, a query request to a virtualized infrastructure manager (VIM) according to the location relationship in order to request an identifier (ID) of a physical host on which an instance of a second VNF that has the location relationship with the first VNF is deployed, wherein the query request comprises an instance ID of the instance of the second VNF;
receiving, by the NFVO, the ID of the physical host from the VIM; and
providing, by the NFVO, the ID of the physical host and the location relationship to the VIM using the VNFM.

9. The method of claim 6, wherein the dependency relationship comprises whether the first VNF and the other VNF are managed by a same VNFM, wherein either running of the other VNF depends on running of the first VNF or running of the first VNF depends on running of the other VNF, and wherein the location relationship comprises either that the first VNF and an instance of the other VNF need to be deployed on a same physical host or that the first VNF and the instance of the other VNF cannot be simultaneously deployed on the same physical host.

10. The method of claim 9, wherein that the types of the plurality of authorized life cycle management operations do not affect the dependency relationship or the location relationship comprises either that the other VNF can still run after an operation corresponding to the operation type is performed on the first VNF instance or that the first VNF and the instance of the other VNF do not have a location exclusion relationship after the operation corresponding to the operation type is performed on the first VNF instance.

11. The method of claim 9, wherein determining the types of the plurality of authorized life cycle management operations comprises:
determining, by the NFVO, that the types of the plurality of authorized life cycle management operations comprise another life cycle management operation type other than disablement and scale-in when both the running of the other VNF depends on the first VNF and the other VNF and the first VNF are managed by different VNFMs; or determining that the types of the plurality of authorized life cycle management operations comprise all life cycle management operation types when both the running of the other VNF depends on the first VNF and the other VNF and the first VNF are managed by the VNFM; and determining that the types of the plurality of authorized life cycle management operations comprise another life cycle management operation type other than migration when the first VNF and the other VNF have the location relationship.

12. A virtualized network function manager (VNFM) for life cycle management, the VNFM comprising:
a memory configured to store a computer executable program code comprising an instruction;
a transceiver coupled to the memory; and
a processor coupled to the memory and the transceiver and configured to execute the computer executable program code to cause the VNFM to:
send an authorization request to a network function virtualization orchestrator (NFVO), wherein the authorization request requests the NFVO to authorize a plurality of life cycle management operations for a first virtualized network function (VNF) instance;
receive authorization policy information from the NFVO, wherein the authorization policy information indicates types of a plurality of authorized life cycle management operations;
receive a life cycle management operation request for the first VNF instance using the transceiver, wherein the life cycle management operation request comprises an instance identifier (ID) of the first VNF instance and an operation type;
determine, according to the life cycle management operation request and the types of the plurality of authorized life cycle management operations, that the operation type in the life cycle management operation request falls within the types of the plurality of authorized life cycle management operations; and
send a resource operation request to a virtualized infrastructure manager (VIM) using the transceiver, wherein the resource operation request comprises the instance ID of the first VNF instance.

13. The VNFM of claim 12, wherein the processor is further configured to execute the computer executable program code to cause the VNFM to generate a correspondence based on the instance ID of the first VNF instance and the authorization policy information.

14. The VNFM of claim 12, wherein the processor is further configured to execute the computer executable program code to cause the VNFM to send an instantiation request to the NFVO using the transceiver before receiving the life cycle management operation request for the first VNF instance using the transceiver, and wherein the instantiation request comprises a authorization request that requests the NFVO to authorize another life cycle management operation other than instantiation of the first VNF instance.

15. The VNFM of claim 14, wherein the processor is further configured to execute the computer executable program code to cause the VNFM to:
receive, using the transceiver, a location relationship and an ID of a physical host corresponding to the location relationship from the NFVO after sending the instantiation request to the NFVO using the transceiver, wherein the location relationship comprises a location relationship between the first VNF instance and an instance of another VNF; and
send the ID of the physical host to the VIM using the transceiver.

16. The VNFM of claim 12, wherein the processor is further configured to execute the computer executable program code to cause the VNFM to:
obtain a VNF descriptor (VNFD) of a first VNF corresponding to the first VNF instance after determining that the operation type falls within the types of the plurality of authorized life cycle management operation;
determine, according to the VNFD, that running of another VNF depends on running of the first VNF, wherein the other VNF and the first VNF are managed by a same VNFM; and
initiate an operation related to an operation type for an instance of the other VNF.

17. A network function virtualization orchestrator (NFVO) for determining a proxy authorization policy, the NFVO comprising:
a memory configured to store a computer executable program code comprising an instruction;
a transceiver coupled to the memory; and
a processor coupled to the memory and the transceiver and configured to execute the computer executable program code to cause the NFVO to:
receive, using the transceiver, an authorization request from a virtualized network function manager (VNFM), wherein the authorization request requests to authorize a plurality of life cycle management operations of a first virtualized network function (VNF) instance;
obtain a VNF descriptor (VNFD) of a first VNF corresponding to the first VNF instance;
determine, according to a dependency relationship or a location relationship between the first VNF and another VNF described in the VNFD, types of a plurality of authorized life cycle management operations for the first VNF, wherein the types of the plurality of authorized life cycle management operations do not affect the dependency relationship or the location relationship; and
send authorization policy information to the VNFM using the transceiver, wherein the authorization policy information indicates the types of the plurality of authorized life cycle management operations.

18. The NFVO of claim 17, wherein the authorization request is carried in an instantiation request for obtaining the first VNF instance, and wherein the authorization request requests to authorize a life cycle management operation other than instantiation of the first VNF instance.

19. The NFVO of claim 18, wherein the the processor is further configured to execute the computer executable program code to cause the NFVO to:
send a query request to a virtualized infrastructure manager (VIM) according to the location relationship after receiving the authorization request to request an identifier (ID) of a physical host on which an instance of a second VNF that has the location relationship with the first VNF is deployed, wherein the query request comprises an instance ID of the instance of the second VNF;
receive, using the transceiver, the ID of the physical host from the VIM; and provide the ID of the physical host and the location relationship to the VIM using the VNFM.

20. The NFVO of claim 17, wherein the dependency relationship comprises whether the first VNF and the other VNF are managed by a same VNFM and whether either running of the other VNF depends on running of the first VNF or running of the first VNF depends on running of the other VNF, and wherein the location relationship comprises either that the first VNF and an instance of the other VNF need to be deployed on a same physical host or that the first VNF and the instance of the other VNF cannot be simultaneously deployed on the same physical host.

* * * * *